United States Patent Office 2,873,230
Patented Feb. 10, 1959

2,873,230

PURIFICATION OF VINYLENE CARBONATE

Robert M. Thomas, Niagara Falls, N. Y., assignor to Olin Mathieson Chemical Corporation, a corporation of Virginia No Drawing. Application April 2, 1956
Serial No. 575,342

1 Claim. (Cl. 202—66)

My invention relates to the purification of vinylene carbonate.

An important synthesis of vinylene carbonate is that of Newman and Addor, J. Am. Chem. Soc. 75, 1263 (1953). This synthesis involves the reaction of chlorine and ethylene carbonate in the presence of ultraviolet light to produce monochloroethylene carbonate as well as by-product hydrogen chloride. The monochloroethylene carbonate is then dehydrochlorinated in ether solution in the presence of an acid acceptor such as a lower trialkylamine to produce the desired vinylene carbonate and the hydrogen chloride salt of the acid acceptor. For example, where the acid acceptor used is triethylamine, triethylamine hydrochloride is produced along with vinylene carbonate in the dehydrochlorination of the monochloroethylene carbonate. This method has been verified and gives an overall yield of approximately 60 percent, based on ethylene carbonate.

Vinylene carbonate polymerizes to form colorless products which can be hydrolyzed to water-soluble polymers similar to those of polyvinyl alcohol. The seemingly pure product obtained by careful distillation of the final reaction mixture produced in the Newman and Addor synthesis, however, fails to give high molecular weight polymers. It is believed that this is due to the presence of a trace of chlorinated or other impurity associated with the vinylene carbonate, which impurity cannot be removed even by fractionation in an 80-plate column.

My invention relates to the purification of vinylene carbonate to remove chlorine-containing or other impurities and has for its object the production of the monomer in such a state of purity that the monomer can be polymerized to a product of higher molecular weight and hence of enhanced utility. Thus, in accordance with my invention, I have discovered that trace chlorinated contaminants which inhibit or retard the polymerization of vinylene carbonate can be removed, or rendered inactive, by distilling the vinylene carbonate and then subjecting it in the vapor phase to temperatures within the range from about 200° C. to 450° C. The heat treatment can be carried out in an unpacked tube or in one which is packed with, for example, nickel or glass. It should be noted, however, that vinylene carbonate will decompose at temperatures as low as 250° C. when in contact with any of various materials, such as silica gel, alumina or active carbon. Therefore, when the vinylene carbonate is heat treated at a temperature of from about 200° C. to 450° C. in accordance with my invention, the conditions used should be such that substantial decomposition does not take place. After the vapor phase heat treatment, the vinylene carbonate is again fractionally distilled and purified vinylene carbonate suitable for use in the production of high molecular weight polymers recovered.

The following examples illustrate various embodiments which fall within the scope of my invention.

EXAMPLE I

Vinylene carbonate was made by the Newman-Addor method, with conditions so adjusted as to give the maximum yield. After removal of ether, the product was distilled at 1–2 mm. Hg to give a water white liquid, $n_D^{25}$ 1.4200. Rectification of the distillate through a micro Podbielniak column gave better than 90 percent recovery of a product of $n_D^{25}$ 1.4190, which boiled at 74° C./32 mm. This latter product was unsuitable for polymerization to high molecular weight polymers.

The rectified vinylene carbonate was added dropwise to a pear-shaped flask immersed in an oil bath at 250° C. Vapors of the monomer were passed through Pyrex tubing maintained at 300° C. in a muffle furnace. The exit gases were condensed in a receiver cooled with ice water. Essentially quantitative recoveries were made in all cases, and the product showed no apparent changes in halogen content, boiling points, or refractive index. Rectification of the resultant product removed the halogen impurity and gave a readily polymerizable monomer, whose polymers were of a much higher molecular weight than those of the monomer which was not heat treated.

EXAMPLE II

Part A

An unpurified sample of vinylene carbonate was polymerized by the following procedure:

Crude vinylene carbonate was prepared by the Newman-Addor method and was rectified through a micro Podbielniak column and a portion mixed with 0.5 weight percent of azodiisobutyronitrile, a polymerization catalyst. This mixture was maintained at 60° C. for 96 hours. The product formed was then ground and the remaining monomer extracted with methanol. A solution of 1 gram of the polymer in 100 milliliters of dimethylformamide was then tested for its intrinsic viscosity. The intrinsic viscosity of this sample was 0.69.

Part B

Another portion of Part A of this example was added dropwise to a pear-shaped flask immersed in an oil bath at 250° C. Vapors of monomer were passed through Pyrex tubing maintained at 300° C. in a muffle furnace. The exit gases were condensed in a receiver cooled with ice water. The condensed vinylene carbonate was then purified by rectification and polymerized by heating at 60° C. for 72 hours while in admixture with 0.5 weight percent of azodiisobutyronitrile. The polymer formed was then ground and the remaining monomer extracted with ethanol. A solution of one gram of the polymer in 100 ml. of dimethylformamide was then tested for its intrinsic viscosity, which was 0.90.

The increase in intrinsic viscosity is proportional to the increase in molecular weight of the polymer. An intrinsic viscosity of less than 0.4 denotes no polymeric properties, while a value of 0.9 represents polymers useful for the manufacture of rigid articles. As the intrinsic viscosity is increased the polymers yield films of better tensile strength and flexibility. Furthermore, they can be plasticized, whereas the films from polymers of lower intrinsic viscosity are weak and cannot be plasticized.

EXAMPLE III

A mixture of 0.65 gram of vinylene carbonate (prepared by distillation from a Newman-Addor reaction mixture followed by heat treatment and subsequent rectification, as in Example I), 0.35 gram of vinyl acetate and 0.0025 gram of azodiisobutyronitrile (as polymerization catalyst) was placed in a glass tube. The tube was flushed with nitrogen and sealed. It was then placed in a water bath and maintained at 60° C. for 144 hours. At the end of this time the tube was broken, the polymer withdrawn, ground to a powder and extracted in a Soxhlet apparatus for four hours with ethanol. In this way any remaining monomers and low molecular weight fractions were eliminated. The polymer was recovered in 62 percent yield and has a softening point of 140° C. A solution of one gram of the polymer was dissolved in 100 milliliters of dimethylformamide. The intrinsic viscosity of this solution was found to be 0.51.

Duplication of this experiment with exactly the same amounts of vinyl acetate, azoisobutyronitrile and vinylene carbonate which had not been heat treated and rectified did not result in the formation of any polymer. The contents of the sealed glass tube remained liquid.

I claim:

A method for the removal from vinylene carbonate of impurities which inhibit the polymerization of the vinylene carbonate which comprises heating the vinylene carbonate at a temperature of about 200° C. to about 450° C. in vapor phase and thereafter fractionally distilling the heat-treated vinylene carbonate and recovering purified vinylene carbonate.

References Cited in the file of this patent
UNITED STATES PATENTS
2,722,525   Price et al. _____ Nov. 1, 1955